United States Patent
Mills et al.

(10) Patent No.: US 10,800,509 B2
(45) Date of Patent: Oct. 13, 2020

(54) AIRCRAFT FLOOR PANEL CONNECTION SYSTEM

(71) Applicant: The Boeing Company, Chicago, IL (US)

(72) Inventors: Christopher J. Mills, Charleston, SC (US); Emily Yang, Ladson, SC (US); Michael Patrick Durbin, Summerville, SC (US); Timothy M. Jones, Summerville, SC (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 15/595,804

(22) Filed: May 15, 2017

(65) Prior Publication Data
US 2018/0327074 A1    Nov. 15, 2018

(51) Int. Cl.
*B64C 1/18*   (2006.01)
*B64C 1/12*   (2006.01)
*B64C 1/06*   (2006.01)

(52) U.S. Cl.
CPC ............... *B64C 1/18* (2013.01); *B64C 1/069* (2013.01); *B64C 1/12* (2013.01)

(58) Field of Classification Search
CPC .............. B64C 1/18; B64C 1/069; B64C 1/12
See application file for complete search history.

(56) References Cited

U.S. PATENT DOCUMENTS

| | | | |
|---|---|---|---|
| 2,403,247 A | 7/1946 | Sullivan | |
| 2,607,447 A | 8/1952 | Tuttle | |
| 2,892,376 A | 6/1959 | Schonfeld | |
| 3,922,946 A | 12/1975 | Grayson | |
| 4,399,642 A | 8/1983 | Bard et al. | |
| 4,478,546 A | 10/1984 | Mercer | |
| 4,479,621 A | 10/1984 | Bergholz | |
| 4,537,542 A | 8/1985 | Pratt et al. | |
| 4,577,450 A | 3/1986 | Large | |

(Continued)

FOREIGN PATENT DOCUMENTS

AU    2003278751 A1    5/2004
CA       2497054 A1    5/2004

(Continued)

OTHER PUBLICATIONS

European Patent Office, Examination Report regarding European Patent Application No. 18 177 708.7-1010, dated Sep. 16, 2019, 4 pages.

(Continued)

*Primary Examiner* — Jessica B Wong
(74) *Attorney, Agent, or Firm* — Kolisch Hartwell, P.C.

(57) ABSTRACT

A floor panel connection system for attaching a floor panel to an aircraft airframe is disclosed. The connection system includes a vertical load resisting coupling device and a shear load resisting coupling device to connect the floor panel to the airframe and resist forces applied to the panel. The vertical load resisting coupling device is configured to resist forces perpendicular to a top facial plane of the floor panel, without significantly resisting lateral forces. The shear load resisting coupling device is configured to resist forces parallel to the top facial plane of the floor panel, without significantly resisting vertical forces.

24 Claims, 6 Drawing Sheets

(56) References Cited

U.S. PATENT DOCUMENTS

| | | | |
|---|---|---|---|
| 4,934,885 A | 6/1990 | Woods et al. | |
| 4,975,014 A | 12/1990 | Ruffin et al. | |
| 5,014,934 A * | 5/1991 | McClaflin | B64C 1/12 244/129.4 |
| 5,090,857 A | 2/1992 | Dunn | |
| 5,164,154 A | 11/1992 | Brown et al. | |
| 5,634,754 A | 6/1997 | Weddendorf | |
| 5,788,443 A | 8/1998 | Cabahug | |
| 6,264,412 B1 | 7/2001 | Nakamura et al. | |
| 6,290,445 B1 | 9/2001 | Duran et al. | |
| 6,474,920 B2 | 11/2002 | Lin | |
| 6,595,734 B2 | 7/2003 | Duran et al. | |
| 7,300,042 B2 | 11/2007 | McClure | |
| 7,338,013 B2 | 3/2008 | Vetillard et al. | |
| 7,967,251 B2 | 6/2011 | Wood | |
| 7,988,395 B2 | 8/2011 | Steffier | |
| 8,075,234 B2 | 12/2011 | McClure | |
| 8,342,787 B2 | 1/2013 | Smith | |
| 8,360,362 B2 | 1/2013 | Kismarton et al. | |
| 8,444,359 B2 | 5/2013 | Grether et al. | |
| 9,217,452 B1 | 12/2015 | Woodall, Jr. et al. | |
| 2002/0050105 A1 | 5/2002 | McCorkle et al. | |
| 2002/0144574 A1 | 10/2002 | Avetisian et al. | |
| 2005/0200066 A1 | 9/2005 | McClure | |
| 2009/0155014 A1 | 6/2009 | McClure | |
| 2009/0169337 A1 | 7/2009 | LaConte et al. | |
| 2009/0180831 A1 | 7/2009 | Kedall | |
| 2012/0061513 A1 | 3/2012 | Gallant et al. | |
| 2012/0225408 A1 | 9/2012 | Moore | |
| 2012/0230796 A1 | 9/2012 | McClure | |
| 2013/0039716 A1 | 2/2013 | McClure | |
| 2013/0084130 A1 | 4/2013 | McClure | |
| 2013/0092793 A1 | 4/2013 | Braeutigam | |
| 2013/0094921 A1 | 4/2013 | McClure | |
| 2014/0086704 A1 | 3/2014 | Hemingway et al. | |
| 2019/0162225 A1 | 5/2019 | Etling et al. | |

FOREIGN PATENT DOCUMENTS

| | | |
|---|---|---|
| CA | 2758594 A1 | 11/2010 |
| CA | 2755256 A1 | 3/2011 |
| CA | 2497054 C | 6/2011 |
| CA | 2476093 C | 5/2012 |
| CA | 2937937 A1 | 9/2015 |
| CN | 102171462 A | 8/2011 |
| CN | 102197231 A | 9/2011 |
| CN | 102439321 A | 5/2012 |
| CN | 102459927 A | 5/2012 |
| CN | 102171462 B | 12/2014 |
| CN | 102439321 B | 5/2015 |
| CN | 102459927 B | 5/2015 |
| EP | 1549457 A1 | 7/2005 |
| EP | 1562261 A2 | 8/2005 |
| EP | 1549457 A4 | 7/2010 |
| EP | 2324256 A2 | 5/2011 |
| EP | 2329156 A2 | 6/2011 |
| EP | 2406506 A1 | 1/2012 |
| EP | 2419649 A2 | 2/2012 |
| EP | 2406506 A4 | 10/2012 |
| EP | 2329156 A4 | 3/2013 |
| EP | 2419649 A4 | 5/2013 |
| EP | 2275692 B1 | 3/2014 |
| EP | 2733061 A1 | 5/2014 |
| EP | 1549457 B1 | 7/2014 |
| EP | 2419649 B1 | 9/2014 |
| EP | 3108148 A1 | 12/2016 |
| EP | 2406506 B1 | 1/2017 |
| FR | 2755483 B1 | 4/2004 |
| FR | 3025178 A1 | 3/2016 |
| JP | H06298186 A | 10/1994 |
| JP | 2015-96770 A | 5/2015 |
| RU | 2440278 C1 | 1/2012 |
| WO | 2004037483 A1 | 5/2004 |
| WO | 2010027439 A2 | 3/2010 |
| WO | 2010027439 A3 | 3/2010 |
| WO | 2010033149 A2 | 3/2010 |
| WO | 2010033149 A3 | 3/2010 |
| WO | 2010134946 A2 | 11/2010 |
| WO | 2010134946 A3 | 11/2010 |
| WO | 2011031283 A2 | 3/2011 |
| WO | 2013120156 A1 | 8/2013 |
| WO | 2015130533 A1 | 9/2015 |

OTHER PUBLICATIONS

European Patent Office, Extended European Search Report on European Patent Application No. 18177708.7-1010, dated Oct. 31, 2018, 7 pages.

U.S. Patent and Trademark Office, U.S. Appl. No. 30/357,292, filed Feb. 15, 2002 by Travis McClure, 7 pages.

Goodrich Interiors, Installation Instructions and Limitations for Model 2787 Track-Mounted Cabin Attendant Seat for Boeing 787 Aircraft, Dec. 9, 2008, 8 pages.

Avibank, New Product Bulletin for E-Nut Fastening System, Jan. 23, 2009, 5 pages.

U.S. Patent and Trademark Office, Non-Final Office Action regarding U.S. Appl. No. 15/595,923, dated Nov. 6, 2019, 30 pages.

U.S. Patent and Trademark Office, Non-Final Office Action regarding U.S. Appl. No. 15/643,425, dated Jan. 6, 2020, 30 pages.

* cited by examiner

AIRCRAFT FLOOR PANEL CONNECTION SYSTEM

FIELD

This disclosure relates to fasteners. More specifically, the disclosed examples relate to systems and methods for fastening floor panels to an aircraft floor support structure.

INTRODUCTION

Airplane floors typically consist of honeycomb sandwich floor panels fastened to floor structure referred to as seat tracks. During operation of an airplane, the floor panels accommodate a variety of forces, or loads. These include both vertical loads from sources such as air pressure differences or people walking on the floor, and shear loads from sources such as attached seats undergoing acceleration and deceleration of the plane. One function of floor panels is to transfer these loads into the body of the airplane. Examples of airplane floors are disclosed in U.S. Pat. No. 8,360,362.

A fastening system typical of current technology is disclosed in U.S. Pat. No. 8,075,234. A fastener assembly is disclosed with a collet body used to fasten two objects with circular apertures together. A sleeve insert is secured in an aperture of a first object and the collet is inserted through the sleeve insert and an aperture of a second object. A stud is used to radially expand the fingers of the collet body. The fingers each include a protruding portion that engages the second object, while the head engages the first object, through the sleeve insert.

Using such current technology, each fastener is configured to resist both vertical and shear loads. Shear loads on an airplane floor are generally more significant than vertical loads, which results in a higher overall capacity for vertical loads than is needed. Also, such current technology often includes a flange on the sleeve insert, which may cause a gap between a large portion of the floor panel bottom face sheet and the seat track. This may lead to concentrated forces on the floor panel, around the flange.

SUMMARY

A floor panel connection system for attaching a floor panel to an airframe is disclosed. The connection system includes a vertical load resisting coupling device and a shear load resisting coupling device to connect the floor panel to the airframe and resist forces applied between the panel and the airframe.

The vertical load resisting coupling device is configured to resist forces perpendicular to a top facial plane of the floor panel, without significantly resisting lateral forces. The shear load resisting coupling device is configured to resist forces parallel to the top facial plane of the floor panel, without significantly resisting vertical forces.

The floor panel may have an edge region overlapping a lateral edge portion of the airframe, and the airframe may have a plurality of apertures along the lateral edge portion.

The vertical load resisting coupling device may include a latch member that is rotatable between an open position and a locked position, and rotates about an axis perpendicular to the top facial plane of the floor panel. The latch member may have a flange portion that engages an underside of the lateral edge portion of the airframe when the latch is in a locked position.

The shear load resisting coupling device may include an insert bonded to the floor panel, with a first protruding element on a first face and a second protruding element on a second face. The first protruding element may extend into an aperture in the floor panel, and the second protruding element may extend into one of the plurality of apertures in the airframe.

A method of resisting shear loads on an aircraft floor panel may comprise positioning the insert between the airframe and the floor panel, such that the first protruding element extends into an aperture in the floor panel and the second protruding element extends into one of the plurality of apertures in the airframe.

A method of resisting vertical loads on an aircraft floor panel may comprise overlapping the edge region of the floor panel with the lateral edge portion, the floor panel including a vertical load resisting coupling device. The method may further comprise rotating the latch member of the vertical load resisting coupling device to engage the flange portion with the underside of the lateral edge portion of the airframe.

The present disclosure provides various systems, apparatus, and methods of use thereof. In some examples, a connection system may include a shear load resisting coupling device and a vertical load resisting coupling device connecting a floor panel and an airframe. In some examples, a connection system may include an insert with a first protrusion from a first face extending into an aperture in a floor panel and a second protrusion from a second face extending into an aperture in an airframe. In some examples, a connection system may include a latch member rotatable between an open and locked position that has a flange portion to engage an underside of an airframe in the locked position.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 3b is an isometric view from below the shear plate of FIG. 3a.

FIG. 6b is an isometric view from below the latch of FIG. 6a.

FIG. 7b is a side view of the latch of FIG. 7a.

FIG. 7c is a top view of the latch of FIG. 7a.

DESCRIPTION

Overview

Various examples of a floor panel connection system having a shear load resisting coupling device and a vertical load resisting coupling device are described below and illustrated in the associated drawings. Unless otherwise specified, the floor panel connection system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other connection systems. The following description of various examples is merely exemplary in nature and is in no way intended to limit the disclosure, its application, or uses. Additionally, the advantages provided by the examples, as described below, are illustrative in nature and not all examples provide the same advantages or the same degree of advantages.

Figure 1:
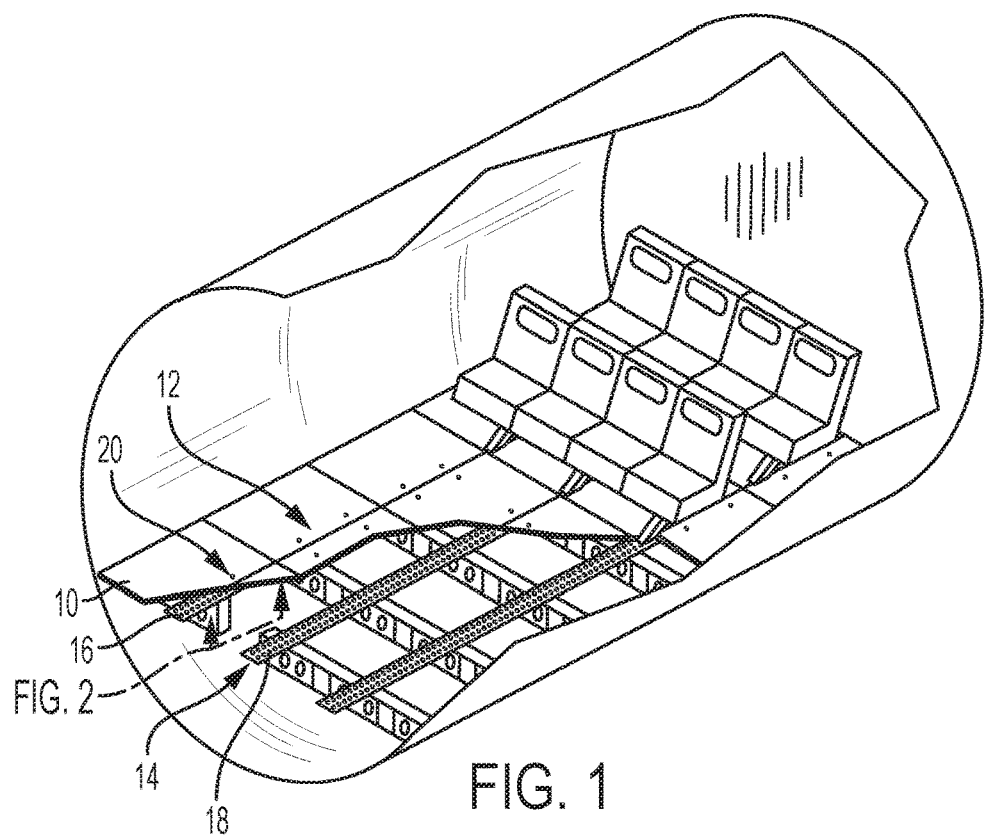
FIG. 1 is a partial, cut-away isometric view of an illustrative airplane cabin.

FIG. 1 shows an illustrative airplane cabin, with seats mounted on a floor of multiple assembled floor panels. Below the floor panels, multiple seat tracks extend longitudinally through the cabin, and each floor panel spans from one seat track to an adjacent seat track. In other areas of the airplane, different airframe components may support the assembled floor panels. Disclosed floor panel connection systems may be used to connect aircraft floor panels to any airframe component that has appropriately dimensioned, and spaced, arrays of holes or apertures in one or more lateral edge regions. An airframe component may take the form of a floor panel support structure, for example, a seat track.

A typical floor panel 10 includes an edge region 12 that overlaps a lateral edge portion 14 of a seat track 16. A plurality of seat track apertures 18 are formed along lateral edge portion 14, and a plurality of floor panel apertures 20 are formed along edge region 12. Floor panel apertures 20 correspond to some or all of seat track apertures 18, and floor panel 10 is disposed on seat track 16 such that corresponding apertures are aligned. In some examples, the plurality of floor panel apertures 20 may include some apertures that do not correspond to any seat track apertures. Also, some corresponding apertures may be offset by a certain distance, rather than aligned.

A plurality of coupling devices extending into or through the corresponding apertures connect floor panel 10 to seat track 16. The coupling devices include vertical load resisting coupling devices 22, which may be referred to as rotating latches or "quarter turn" latches referring to a preferred example, that resist vertical loads without significantly resisting shear loads. Also included are shear load resisting coupling devices 24, which may be referred to as shear plates, that resist shear loads without significantly resisting vertical loads. Vertical loads are defined as forces applied to floor panel 10 in a direction perpendicular to the cabin floor and shear loads are defined as forces applied to the panel in a direction parallel to the cabin floor. Rotating latches 22 and shear plates 24 may also be used to splice floor panels to one another at edges orthogonal to edge region 12.

Figure 2:
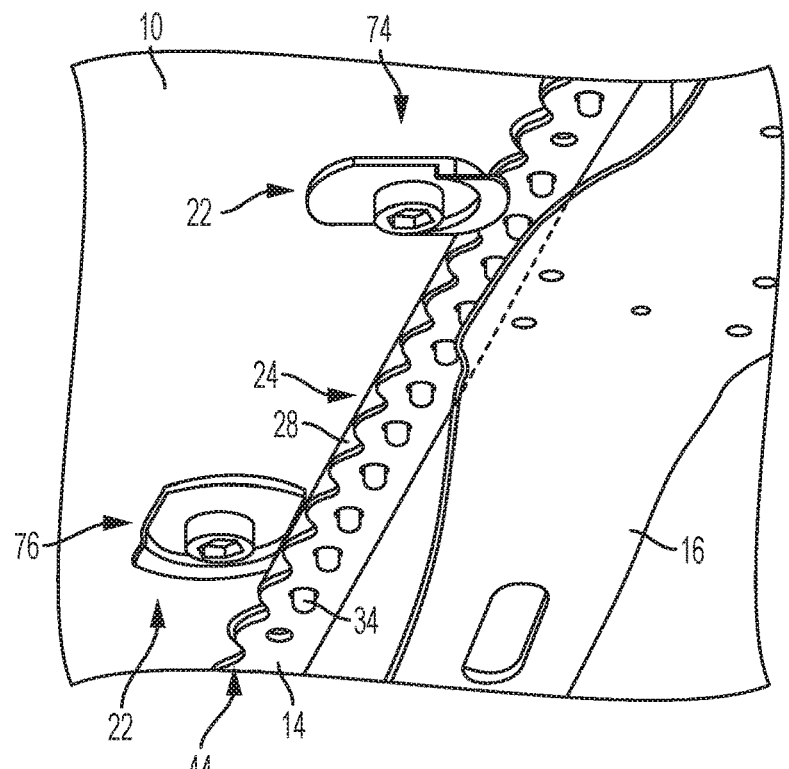
FIG. 2 is a detailed isometric view from below a seat track and floor panel of the airplane cabin of FIG. 1.

FIG. 2 is a detail perspective view of floor panel 10 and seat track 16, from below. One shear plate 24 and two rotating latches 22 are shown connecting the floor panel and seat track. In other examples, any number or combination of shear plates 24 and rotating latches 22 may be used to connect the floor panel and the seat track.

Figure 3A:
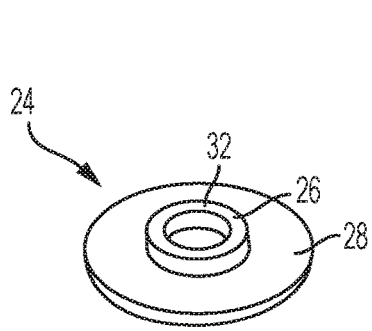
FIG. 3a is an isometric view of an example of a shear plate.
Figure 3B:
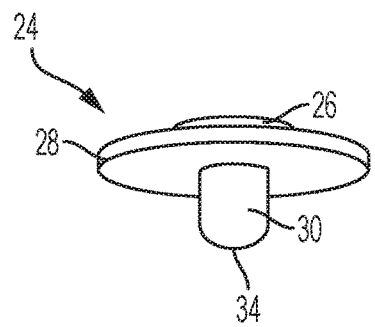

An example of shear plate 24 pictured in FIGS. 3a and 3b comprises a boss 26, a circular flange 28, and a pin 30. Boss 26 and pin 30 are integrally formed on opposite sides of flange 28, and aligned along a central axis. Boss 26 is annular in shape with a flat top surface 32, and pin 30 has a rounded blunt end 34.

Figure 4:
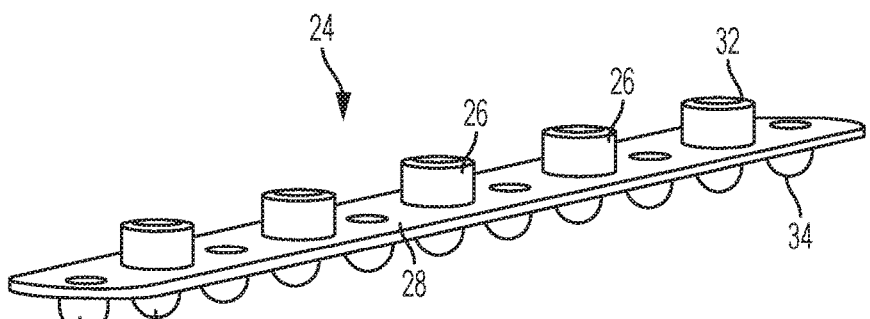
FIG. 4 is an isometric view of another example of a shear plate.

In another example shown in FIG. 4, shear plate 24 comprises a plurality of bosses 26, a rounded rectangular flange 28, and a plurality of pins 30. A count of the plurality of pins 30 is one more than twice a count of the plurality of bosses 26. Each boss 26 is aligned with one of the plurality of pins 30. Bosses 26 are spaced to correspond to some subset of apertures 36 of the plurality of floor panel apertures 20, and similarly pins 30 are spaced to correspond to some subset of the plurality of seat track apertures 18. Bosses 26 are also annular in shape, but with a rounded top surface 32.

Any appropriate number of bosses and pins may be included on shear plate 24. A count of the plurality of pins 30 may be equal to a count of the plurality of bosses 26, may be more, or may be less. In some examples, such as the one shown in FIG. 5b, bosses 26 may not be aligned with pins 30. Bosses 26 may have a rounded or a flat top surface 32. Both bosses 26 and pins 30 may be hollow, solid, or filled with a light reinforcing material.

All pictured examples include bosses and pins. However, any appropriate protruding element may be included on a first and second face of flange 28, which may also be referred to as an insert. For example, a peg, rod, tab, or stud may be used.

Figure 5A:
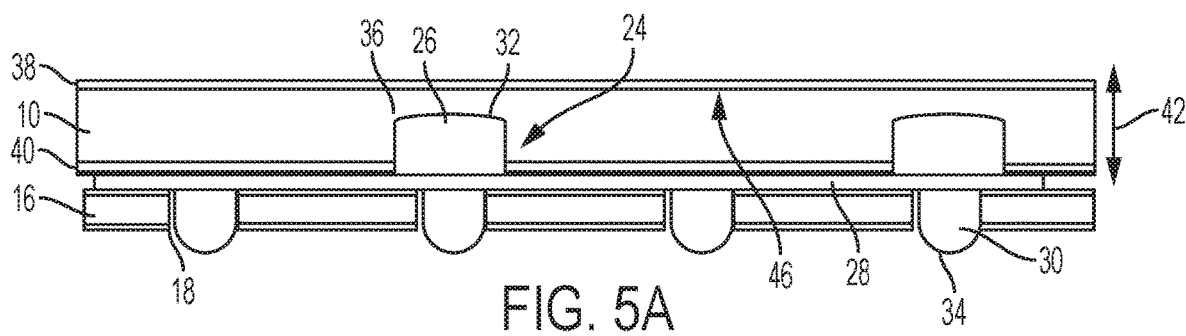
FIG. 5a is a cross-sectional view of an example of a shear plate connecting a floor panel and a seat track.
Figure 5B:
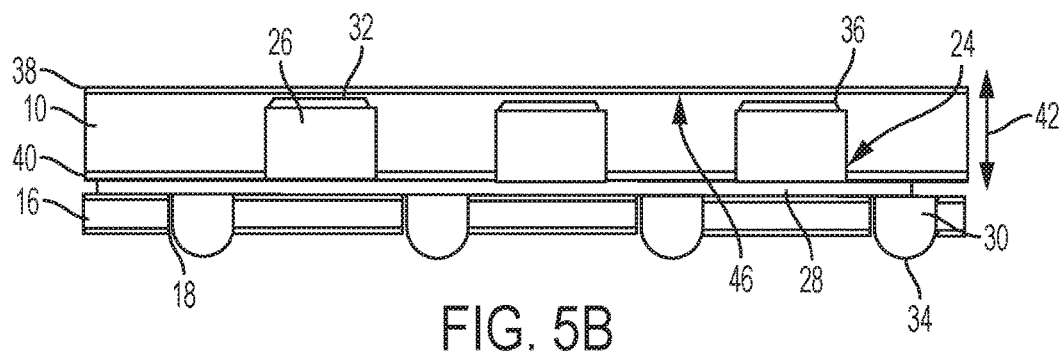
FIG. 5b is a cross-sectional view of another example of a shear plate connecting a floor panel and a seat track.
Figure 5C:
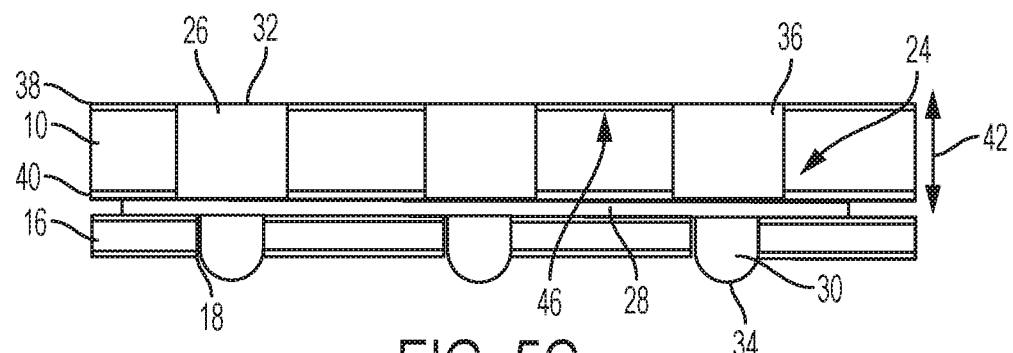
FIG. 5c is a cross-sectional view of another example of a shear plate connecting a floor panel and a seat track.

FIGS. 5a-c show three examples of shear plate 24 inserted between floor panel 10 and seat track 16. In each example, floor panel 10 includes a top skin 38, a bottom skin 40, and a cross-section or thickness 42. Multiple pins 30 extend from a flange 28 through corresponding seat track apertures 18. Flange 28 is sandwiched between floor panel 10 and seat track 16, and in contact with both. Pins 30 have sufficient length that a rounded blunt end 34 of each pin is proud of an underside 44 of seat track 16. The pins are also of a diameter matching apertures 18 so that the pins fit snugly in the apertures, but do not generate sufficient friction to impede insertion or removal.

Referring to the example pictured in FIG. 5a, two apertures 36 are formed in bottom skin 40 of floor panel 10, and extend partway through thickness 42. Two bosses 26 extend up from flange 28, each aligned with one of four pins 30. Each boss is of a height matching an aperture 36, such that when the bosses are inserted into the apertures, flange 28 lies flat against floor panel bottom skin 40. Flange 28 is bonded to bottom skin 40, retaining shear plate 24 in floor panel 10 and allowing a combination of the floor panel and the shear plate to be manipulated as a unit.

FIG. 5b shows an example of shear plate 24 including three bosses 26 and four pins 30. Three apertures 36 are formed in bottom skin 40 of floor panel 10, and extend through thickness 42 to an inside surface 46 of top skin 38. Bosses 26 have flat top surfaces 32 appropriate to make contact with inside surface 46, and are aligned between adjacent pins 30. Each boss is of a height matching an aperture 36, such that when flat top surface 32 is in contact with inside surface 46 of top skin 38, flange 28 lies flat against floor panel bottom skin 40. Top surface 32 of each boss 26 is bonded to inside surface 46, retaining shear plate 24 in floor panel 10 and allowing a combination of the floor panel and the shear plate to be manipulated as a unit.

In the example pictured in FIG. 5c, three apertures 36 are formed through both bottom skin 40 and top skin 38 and extend completely through thickness 42 of floor panel 10. Three bosses 26 extend up from flange 28, each aligned with one of three pins 30. Each boss is of a height matching an aperture 36, such that when the bosses are inserted into the apertures, flange 28 lies flat against floor panel bottom skin 40 and top surface 32 of each boss is flush with an outside surface of top skin 38. The bosses may be visible from above the floor panel, aiding in correct placement of aligned pins 30 below. Flange 28 is bonded to bottom skin 40, retaining shear plate 24 in floor panel 10 and allowing a combination of the floor panel and the shear plate to be manipulated as a unit.

Referring again to FIG. 2, shear plate 24 is shown connecting floor panel 10 to seat track 16. During use of the airplane cabin, floor panel 10 may experience both vertical and shear loads. In particular, shear loads may range up to as much as a 9G force under adverse conditions. Shear plate 24 is appropriately manufactured of a sufficiently strong material to withstand such a load. Bosses 26 engage sufficiently with floor panel 10 and pins 30 engage sufficiently with seat track 16 to prevent lateral movement of the floor panel relative to the seat track. That is, shear plate 24 resists forces applied to floor panel 10 parallel to a top facial plane of the panel and prevents the panel from moving relative to seat track 16 in that plane.

However, shear plate 24 does not significantly resist forces perpendicular to the top facial plane. Aside from minimal frictional resistance from interactions of pins 30 with seat track apertures 18, shear plate 24 allows floor panel 10 to be freely lifted or lowered into place. During installation or replacement, an installer may lift a combination of floor panel 10 and shear plate 24 clear of seat track 16 without needing the aid of a tool or other device. Rounded blunt ends 34 of pins 30 may aid installation by redirecting downward forces to center pins 30 in seat track apertures 18, when placement is not exact.

Also shown in FIG. 2 are two rotating latches 22, installed in floor panel 10. Two examples of the rotating latch are more fully shown in FIGS. 6a and 6b, and FIGS. 7a-c, each comprising a latch member 48 and an insert 50. The insert couples the latch member to floor panel 10 by extending through one aperture 52 of the plurality of floor panel apertures 20.

Latch member 48 includes a main planar body 54, a lower cylindrical body 56, and a flange region or lip 58, with the lower body and lip both formed on a lower surface of the main body. Insert 50 is rotatably coupled to an opposite upper surface of the main body. A passage 60 extends through insert 50, main body 54, and lower body 56, and defines a central axis 62. Latch member 48 is free to rotate relative to insert 50, about the central axis.

Main body 54 has an engaging edge 64 and an opposite edge 66, with lip 58 extending out past the engaging edge. Engaging edge 64 is a modified convex shape, with one side squared to form a rotation stop region 68. A detent 70 may protrude from the upper surface of main body 54 proximate opposite edge 66.

Lip 58 extends down from main body 54 proximate to engaging edge 64, by a distance or lip depth that may approximately correspond to a thickness of seat track lateral edge portion 14. Lip 58 then extends parallel to main body 54, out past engaging edge 64 by an overlap length 72, and ending in a convex outer edge. Lip 58 may be otherwise formed on main body 54 in other examples. For example, lip 58 may have a thickness equal to half or less than a thickness of main body 54 and may extend from a lower half of engaging edge 64. The lip depth and overlap length may also differ between examples, to facilitate correct engagement with seat track 16.

Rotating latch 22 has a locked position 74 with engaging edge 64 generally aligned along seat track lateral edge portion 14, and an open position 76 with the engaging edge generally perpendicular to lateral edge portion 14. Latch member 48 is rotated by 90 degrees about central axis 62 to transition rotating latch 22 between open and locked positions. Both positions can be seen in FIG. 2. In examples with different geometry of latch member 48, the rotating latch 22 may be transitioned between open and locked positions by a rotation of any appropriate degree.

In locked position 74, lip 58 overlaps seat track 16 by overlap length 72 and is disposed below lateral edge portion 14. Rotation stop region 68 may be in contact with an outer edge of the seat track lateral edge portion, preventing rotation in one direction. For example, if the latch member was rotated in a clockwise direction from open position 76 to locked position 74, then rotation stop region 68 may prevent further clockwise rotation.

In open position 76, rotating latch 22 does not contact or overlap seat track 16. The open position may also comprise any orientation of rotating latch 22 that does not impede placement of floor panel 10 on seat track 16 with edge region 12 overlapping lateral edge portion 14.

Latch member 48 is configured such that the latch member may freely rotate between open and locked positions, but also such that lip 58 overlaps seat track 16 by the appropriate amount. Floor panel aperture 52 may be disposed at distance from seat track 16 that facilitates this configuration.

In the pictured examples, a majority of the upper surface of main body 54 is in contact with an underside of floor panel 10. The lip depth is sufficient to allow lip 58 to rotate into place below lateral edge portion 14, but limited enough that the lip fits snugly against the seat track. In other examples engaging edge 64 or lip 58 may have a different shape to facilitate the transition between the open and locked positions.

Floor panel 10 may further include a detent recess 78 in the underside, positioned to mate with detent 70 when rotating latch 22 is in locked position 74. This may serve to retain rotating latch 22 in the locked position unless sufficient rotational force is applied.

Access to latch member 48 from below may be not be available when floor panel 10 is disposed on seat track 16. Instead, latch member 48 may be rotated by use of a tool engaging a fastener inserted through passage 60. A hex-shaped tooling recess 80 is formed in lower body 56, centered around an end of passage 60. A nut of complementary shape may be disposed in recess 80, and engage with a blind fastener inserted from above. A tool may rotate the fastener, which may engage the nut, which may in turn transfer rotational force to latch member 48. In other examples, the tooling recess may be of another shape to accommodate another type of nut or fastener. Or other mechanisms for engaging a tool from above may be included in latch member 48.

Figure 6A:
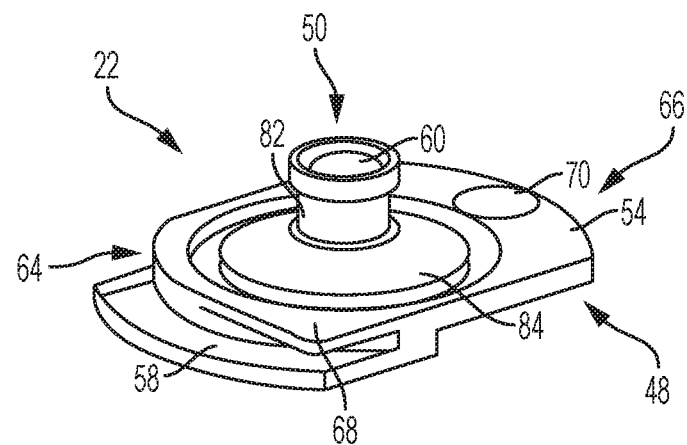
FIG. 6a is an isometric view of an example of an assembly including a latch combined with an insert.
Figure 6B:
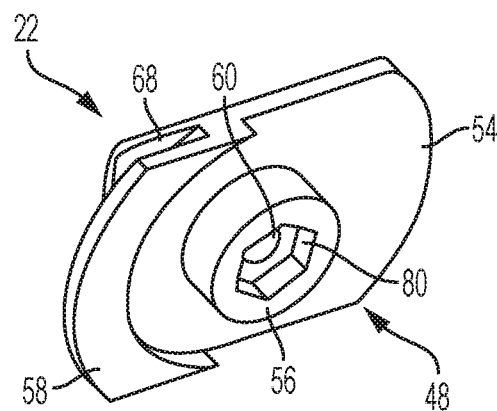

Insert 50 may have a variety of shapes. One example is shown in FIGS. 6a and 6b. The insert has a cylindrical body 82 with a flange 84 at a bottom end. Cylindrical body 82 extends through floor panel aperture 52, a top end flush with a top surface of floor panel 10. A circular recess is inset into the upper surface of latch member main body 54, and flange 84 is disposed in the recess. A top surface of the flange is flush with the upper surface of main body 54, and flange 84 is bonded to the underside of the floor panel. Latch member 48 is free to rotate relative to insert 50, about the central axis.

Figure 7A:
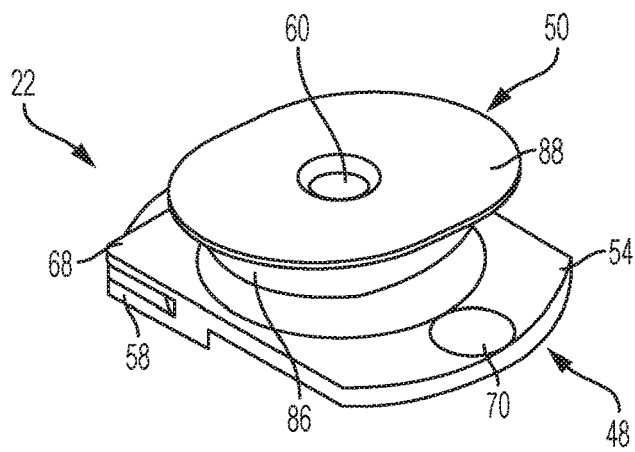
FIG. 7a is an isometric view of another example of a latch assembly for connecting a floor panel to a seat track.
Figure 7B:
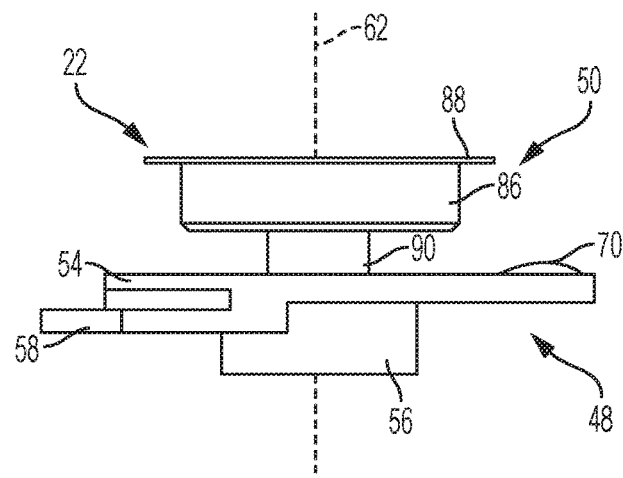
Figure 7C:
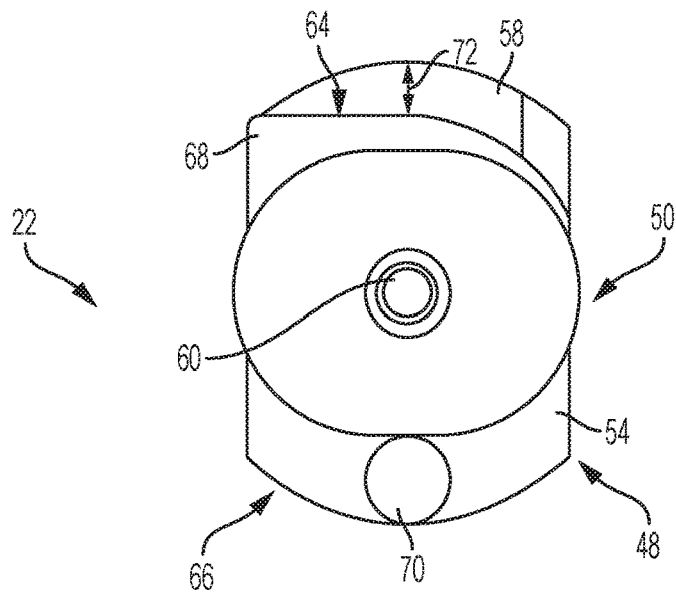

FIGS. 7*a*-*c* show another example of insert 50, comprised of an oblong body 86, a flange 88, and a cylindrical connector 90. In this example, aperture 52 of floor panel 10 has an oblong shape appropriate to accommodate oblong body 86. Flange 88 is disposed on an upper surface of floor panel 10 and proud of the floor panel. Oblong body 86 and cylindrical connector 90 extend through aperture 52 to couple to latch member 48 at the underside of the floor panel. Floor panel 10 is thereby cooperatively captured between insert 50 and latch member 48. The oblong shape of insert 50 may serve to resist rotation of the insert when latch member 48 is rotated.

Insert 50 may be coupled to latch member 48 by any appropriate mechanism that allows free rotation between the components. For example, some examples may include snap-fit parts in cylindrical body 82 or cylindrical connector 90 and on main body 54.

During use of the airplane cabin, floor panel 10 may experience both vertical and shear loads. Vertical loads may be greatest under explosive decompression. Rotating latch 22 is appropriately manufactured of a sufficiently strong material to withstand such a load. In locked position 74, lip 58 engages sufficiently with seat track 16 and insert 50 is coupled to latch member 48 strongly enough to prevent vertical movement of the floor panel relative to the seat track. That is, rotating latch 22 resists forces applied to floor panel 10 perpendicular to a top facial plane of the panel and prevents the panel from moving relative to seat track 16 in a direction perpendicular to that plane.

However, rotating latch 22 does not significantly resist forces parallel to the top facial plane. Aside from minimal frictional resistance from interaction of lip 58 with seat track 16, rotating latch 22 allows floor panel 10 to be slid over seat track 16. During installation or replacement, an installer may slide floor panel 10 along seat track 16 to adjust the panel's position, even after rotating latch 22 has been turned to locked position 74.

Figure 8:
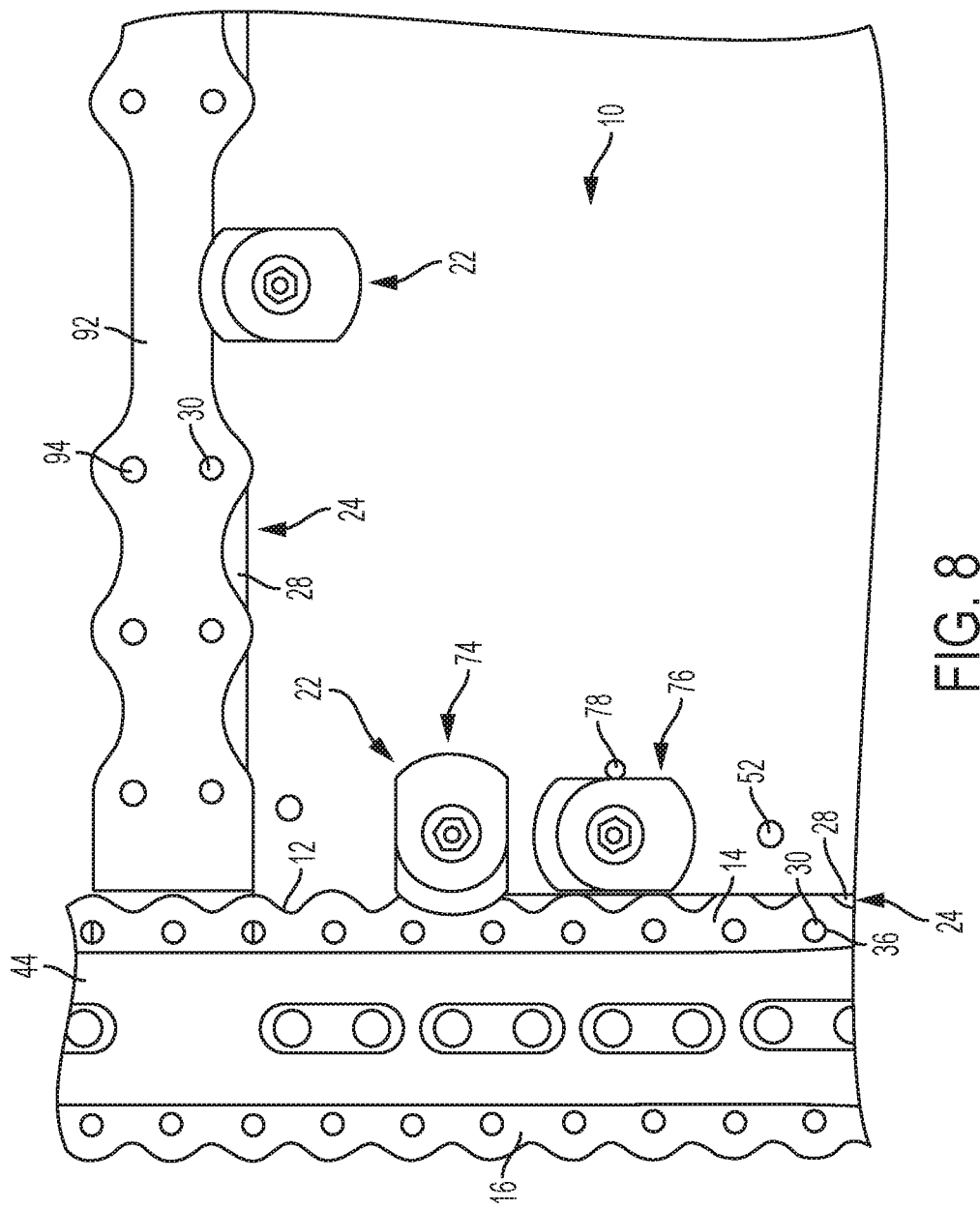
FIG. 8 is a bottom plan view of an example of a floor panel connection system from underneath a seat track.

Rotating latches 22 and shear plates 24 may be used distant from one another on floor panel 10, or may be used at the same point along edge region 12. FIGS. 2 and 8 show an example in which the two coupling devices are used together.

The plurality of floor panel apertures 20 includes a plurality of apertures 36 appropriate to shear plates 24 and another plurality of apertures 52 appropriate to rotating latches 22. Apertures 36 may extend through all of thickness 42 of floor panel 10, or may extend partially through the thickness. Both pluralities 36 and 52 are disposed in edge region 12, but apertures 52 are disposed further from an outermost edge of the edge region and do not overlap seat track 16.

Rotating latches 22 have a lip depth appropriate to accommodate a combination of a thickness of shear plate flange 28 and a thickness of seat track lateral edge portion 14. Engaging edge 64 is shaped to avoid contact with rounded blunt ends 34 of adjacent pins 30, when latch member 48 is rotated between open position 76 and locked position 74. Rotation stop region 68 may contact an edge of shear plate flange 28 when in locked position 74.

The example shown in FIG. 8 also includes a shear plate 24 and a rotating latch 22 used to connect two floor panels 10 at a splice. A splice track 92, including a plurality of apertures 94 is disposed below two floor panels 10. Each floor panel also includes a plurality of apertures along an abutting edge. The shear plate 24 has been inserted between one floor panel 10 and splice track 92, with pins 30 extending through splice track apertures 94 and boxes extending into floor panel the floor panel apertures. Rotating latch 22 is coupled to floor panel 10 proximate splice track 92 and disposed in a locked position with lip 58 overlapping the splice track. Each floor panel 10 may be thereby connected to splice track 92, and thus connected to the abutting floor panel.

In another example, not shown, a floor panel connection system may be used to connect a floor panel to a cargo floor of an airplane. Any embodiment of a floor panel connection system as previously described may be used to connect a floor panel to any appropriate aircraft airframe or floor support structure.

Manner of Operation/Use

Figure 9:
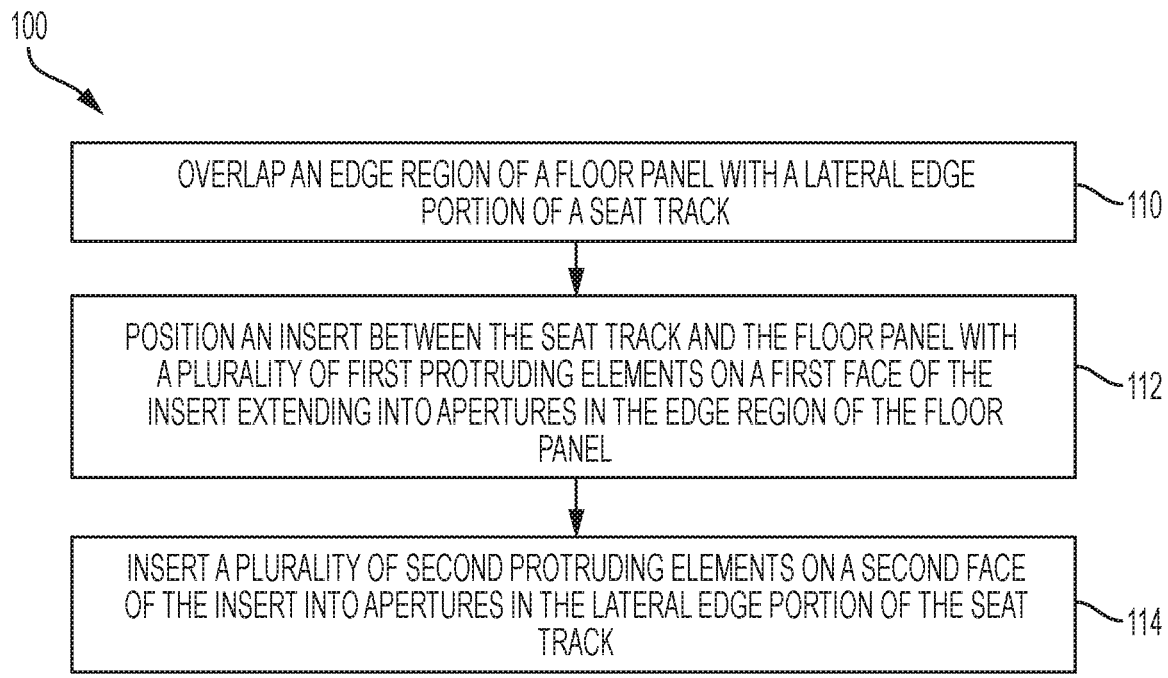
FIG. 9 is a diagrammatic representation of a flow chart illustrating a method for resisting shear loads on a floor panel with a shear plate.

FIG. 9 describes an illustrative method 100 for resisting shear loads on a floor panel 10 with a shear plate 24. The method may be used in conjunction with any of the shear plate examples previously described.

Method 100 includes a first step 110 of overlapping an edge region 12 of floor panel 10 with a lateral edge portion 14 of a seat track 16, where the floor panel has a plurality of apertures 36 and the seat track has a plurality of apertures 18. Then in step 112, shear plate 24 is positioned between the floor panel and seat track, such that one or more bosses 26 of the shear plate 24 extend into floor panel apertures 36. Finally, in step 114, one or more pins 30 of the shear plate are inserted through seat track apertures 18.

In some examples method 100 may also include bonding flange 28 of shear plate 24 to an underside of floor panel 10, or bonding bosses 26 to an inside surface 46 of a top skin 38. In other examples, shear plate 24 may be bonded to floor panel 10 prior to performing method 100. That is, shear plate 24 may be installed in floor panel 10 prior to assembly of an aircraft floor that includes floor panel 10. This may help to reduce assembly time and cost.

Figure 10:
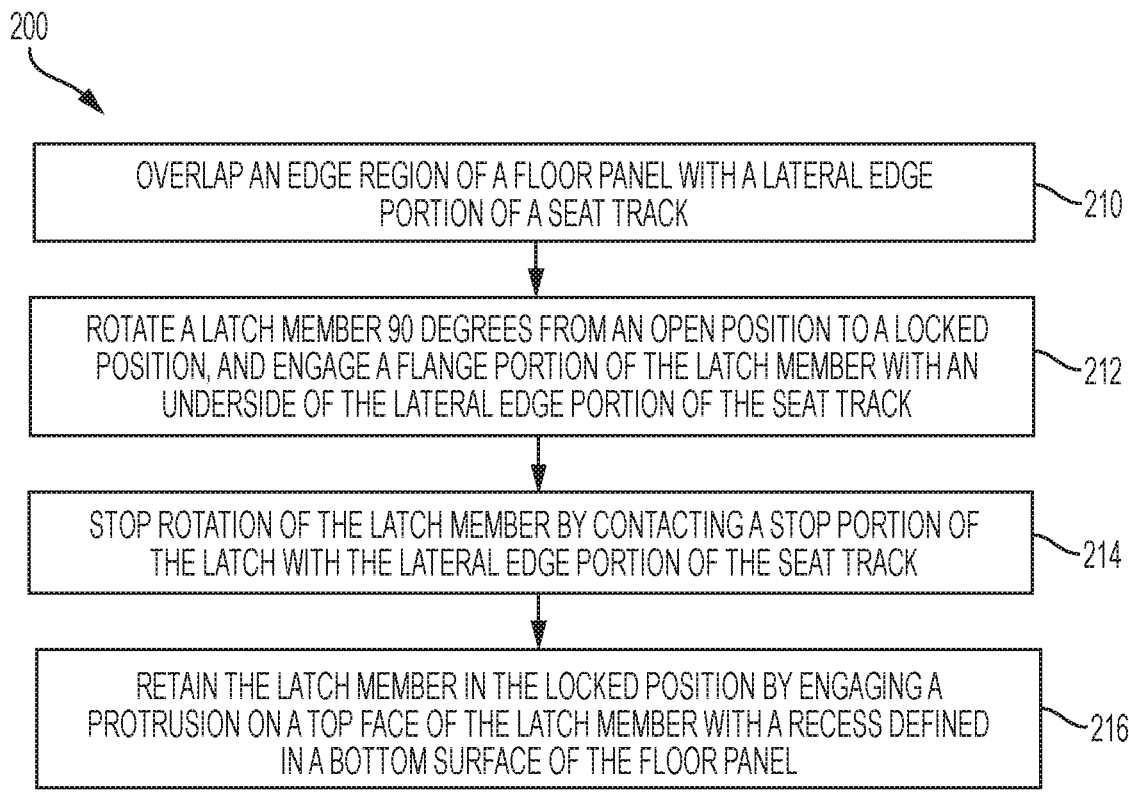
FIG. 10 is a diagrammatic representation of a flow chart illustrating a method for resisting vertical loads on a floor panel with a latch.

FIG. 10 describes an illustrative method 200 for resisting vertical loads on a floor panel 10 with a rotating latch 22. The method may be used in conjunction with any of the rotating latch examples previously described.

Method 200 begins with step 210 of overlapping an edge region 12 of floor panel 10 with a lateral edge portion 14 of a seat track 16, where the floor panel has a rotating latch 22 coupled to the floor panel. Next is a step 212 of rotating a latch member 48 of the rotating latch by 90 degrees, from an open position 76 to a locked position 74, and engage a lip 58 of the latch member with an underside of lateral edge portion 14 of seat track 16.

Step 214 comprises stopping rotation of latch member 48 by contacting a rotation stop portion 68 of the latch member with lateral edge portion 14. Method 200 lastly includes step 216 of retaining latch member 48 in locked position 74 by engaging a detent 70 with a recess 78 defined in a bottom surface of floor panel 10.

Although various steps of methods 100 and 200 are described above and depicted in FIGS. 9 and 10, the steps need not necessarily all be performed, in some cases may be performed in a different order than the order shown, and in some cases may be performed simultaneously. In some examples, a method for resisting load on a floor panel may include steps from both method 100 and method 200. For example a method may include steps 110, 112, and 114 of method 100, and steps 212, 214, and 216 of method 200. The two methods may be combined and repeated to connect a floor panel to a seat track with multiple shear plates and multiple rotating latches.

Additional Examples

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A floor panel connection system, comprising:

an aircraft airframe having a plurality of apertures along a lateral edge portion, a floor panel having an edge region configured for overlapping engagement with the lateral edge portion of the airframe, a vertical load resisting coupling device connecting the floor panel to the airframe, configured for resisting forces applied to the panel in a direction perpendicular to a top facial plane of the floor panel without significantly resisting lateral forces applied to the floor panel, and a shear load resisting coupling device connecting the floor panel to the airframe separate from the vertical load resisting coupling device, configured for resisting forces applied to the panel in a direction parallel to the top facial plane of the floor panel without significantly resisting vertical forces applied to the floor panel.

A1. The floor panel connection system of A, wherein the shear load resisting coupling device includes an insert positioned between the lateral edge portion of the airframe and the edge region of the floor panel.

A2. The floor panel connection system of A1, wherein the insert has a first face and a second face, the first face having a first protruding element, the second face having a second protruding element, the first protruding element extending into an aperture in the edge region of the floor panel, and the second protruding element extending into an aperture in the lateral edge portion of the airframe.

A3. The floor panel connection system of A2, wherein the first protruding element extends only partially through a cross-section of the floor panel.

A4. The floor panel connection system of A2, wherein the first protruding element extends completely through a cross-section of the floor panel.

A5. The floor panel connection system of A2, wherein the floor panel has a bottom skin and a top skin, the first protruding element extending through the bottom skin and being bonded to an inside surface of the top skin.

A6. The floor panel connection system of A1, wherein the insert is bonded to an underside of the edge region of the floor panel.

A7. The floor panel connection system of A2, wherein the insert has multiple protruding elements extending into apertures in the edge region of the floor panel, and multiple protruding elements extending into apertures in the lateral edge portion of the airframe.

A8. The floor panel connection system of A2, wherein the first and second protruding elements are aligned.

A9. The floor panel connection system of A2, wherein the first and second protruding elements are not aligned.

A10. The floor panel connection system of A, wherein the vertical load coupling device includes a latch member in the edge region of the floor panel, the latch member being rotatable, between an open position and a locked position, about an axis perpendicular to a top facial plane of the panel, the latch member having a flange portion that engages an underside of the lateral edge portion of the airframe when the latch is in the locked position.

A11. The floor panel connection system of A10, wherein the latch member rotates ninety degrees between the open position and the locked position.

A12. The floor panel connection system of A10, wherein the floor panel has an aperture, the latch member being coupled to the floor panel via an insert extending through the aperture.

A13. The floor panel connection system of A12, wherein the insert is bonded to an underside of the floor panel.

A14. The floor panel connection system of A12, wherein the insert and the latch member cooperatively capture the floor panel.

A15. The floor panel connection system of A10, wherein the latch member has a rotation stop portion that contacts the airframe when the latch is in the locked position.

A16. The floor panel connection system of A10, wherein the latch member has a protrusion that engages a detent recess in an underside of the floor panel when the latch member is in the locked position.

A17. The floor panel connection system of A, wherein the shear load resisting coupling device is capable of resisting a 9G shear force.

A18. The floor panel connection system of A, wherein the airframe is a seat track.

B. An apparatus, comprising:

an aircraft floor support structure having a lateral edge portion, and a floor panel having an edge region overlapping the lateral edge portion of the floor support structure, including a latch member in the edge region of the floor panel, the latch member being rotatable, between an open position and a locked position, about an axis perpendicular to a top facial plane of the panel, the latch member having a flange portion that engages an underside of the lateral edge portion of the floor support structure when the latch is in the locked position.

B1. The floor panel connection system of B, wherein the floor panel has an aperture, the latch member being coupled to the floor panel via an insert extending through the aperture.

B2. The floor panel connection system of B1, wherein the insert is bonded to an underside of the floor panel.

B3. The floor panel connection system of B1, wherein the insert and the latch member cooperatively capture the floor panel.

B4. The floor panel connection system of B, wherein the latch member has a rotation stop portion that contacts the floor support structure when the latch is in the locked position.

B5. The floor panel connection system of B, wherein the latch member has a protrusion that engages a detent recess in an underside of the floor panel when the latch member is in the locked position.

B6. The floor panel connection system of B, wherein the latch member rotates ninety degrees between the open position and the locked position.

C. An apparatus, comprising an aircraft floor support structure having a plurality of apertures along a lateral edge portion, a floor panel having an edge region overlapping the lateral edge portion of the floor support structure, and a shear load coupling device including an insert having a first face and a second face, the first face having a first protruding element, the second face having a second protruding element, the first protruding element extending into an aperture in the edge region of the floor panel, and the second protruding element extending into an aperture in the lateral edge portion of the floor support structure.

C1. The floor panel connection system of C, wherein the first protruding element extends only partially through a cross-section of the floor panel C2. The floor panel connection system of C, wherein the first protruding element extends completely through a cross-section of the floor panel.

C3. The floor panel connection system of C, wherein the floor panel has a bottom skin and a top skin, the first protruding element extending through the bottom skin and being bonded to an inside surface of the top skin.

C4. The floor panel connection system of C, wherein the insert is bonded to an underside of the edge region of the floor panel.

C5. The floor panel connection system of C, wherein the insert has multiple protruding elements extending into apertures in the edge region of the floor panel.

C6. The floor panel connection system of C, wherein the insert has multiple protruding elements extending into apertures in the lateral edge portion of the floor support structure.

C7. The floor panel connection system of C, wherein the first and second protruding elements are aligned.

C8. The floor panel connection system of C, wherein the first and second protruding elements are not aligned.

D. A method of resisting shear loads on an aircraft floor panel, comprising:

positioning an insert between an airframe and a floor panel, the insert having a first face and a second face, the first face having a first protruding element, the second face having a second protruding element, the first protruding element extending into an aperture in an edge region of the floor panel, and the second protruding element extending into an aperture in a lateral edge portion of the airframe.

D1. The method of D, further comprising: Inserting multiple protruding elements from the second face into apertures in the lateral edge portion of the airframe.

D2. The method of D, further comprising: Coupling the edge region of the floor panel to the lateral edge portion of the airframe with a vertical load resisting coupling device.

D3. The method of D2, the coupling step comprising:

rotating a latch member on the edge region of the floor panel from an open position to a locked position, about an axis perpendicular to a top facial plane of the panel, the latch member having a flange portion engaging an underside of the lateral edge portion of the airframe when the latch is in the locked position.

E. A method of resisting vertical loads on an aircraft floor panel, comprising:

overlapping an edge region of a floor panel with a lateral edge portion of an airframe, and rotating a latch member from an open position to a locked position, about an axis perpendicular to a top facial plane of the panel, the latch member having a flange portion engaging an underside of the lateral edge portion of the airframe when the latch is in the locked position.

E1. The method of E, the rotating step comprising:

Rotating the latch member ninety degrees.

E2. The method of E, further comprising:

stopping rotation of the latch member by contacting a stop portion of the latch with a lateral edge portion of the airframe.

E3. The method of E, further comprising:

retaining the latch member in the locked position by engaging a protrusion on a top face of the latch member with a recess defined in a bottom surface of the floor panel.

F. A floor panel assembly for an aircraft, comprising:

a planar expanse having a top face, a bottom face, an edge region, and an aperture in the edge region, a latch member mounted through the aperture, the latch member being rotatable, between an open position and a locked position, about an axis perpendicular to the top and bottom faces of the expanse, the latch member having a flange portion configured to engage an underside of a lateral edge portion of a floor support structure when the latch is in the locked position, and an insert bonded to the edge region of the expanse, wherein the insert has a first face and a second face, the first face having a first protruding element, the second face having a second protruding element, the first protruding element extending into an aperture in the edge region of the expanse, and the second protruding element configured to extend into an aperture in a lateral edge portion of a floor support structure.

F1. The floor panel assembly of F, wherein the insert is bonded to an underside of the edge region of the floor panel.

F2. The floor panel assembly of F, wherein the insert has multiple protruding elements extending from the first side of the insert into apertures in the edge region of the floor panel.

F3. The floor panel assembly of F, wherein the insert has multiple protruding elements extending from the second side of the expanse, and configured to extend into apertures in the lateral edge portion of the floor support structure.

F4. The floor panel assembly of F, wherein the first and second protruding elements are aligned.

F5. The floor panel assembly of F, wherein the first and second protruding elements are not aligned.

G. A method of installing a floor panel in an aircraft, comprising:

inserting protrusions provided in an edge region of a floor panel into apertures provided in a lateral edge portion of a floor support structure, and rotating a latch member provided in the edge region of the floor panel, about an axis perpendicular to a top facial plane of the floor panel, from an open position to a locked position.

G1. The method of G, wherein the rotating step includes turning the latch member ninety degrees.

G2. The method of G, further comprising:

mechanically limiting rotation of the latch member when it reaches the locked position.

Advantages, Features, Benefits

The different examples of the floor panel connection system described herein provide several advantages over known solutions for connecting floor panels to airplane airframes. For example, the illustrative examples of a floor panel connection system described herein simplify shear load resisting fasteners and reduce the number of vertical load resisting fasteners. Additionally, and among other benefits, illustrative examples of a floor panel connection system described herein allow one shear plate to fasten multiple airframe apertures to multiple floor panel apertures, reducing part count and better distributing loads. No known system or device can perform these functions, particularly in airplane assembly. Thus, the illustrative examples described herein are particularly useful for reducing airplane construction cost. However, not all examples described herein provide the same advantages or the same degree of advantage.

CONCLUSION

The disclosure set forth above may encompass multiple distinct inventions with independent utility. Although each of these inventions has been disclosed in its preferred form(s), the specific examples thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A floor panel connection system, comprising:
an aircraft airframe having a plurality of apertures along a lateral edge portion,
a floor panel having an edge region configured for overlapping engagement with the lateral edge portion of the airframe,
a vertical load resisting coupling device connecting the floor panel to the airframe, configured for resisting forces applied to the panel in a direction perpendicular to a top facial plane of the floor panel without significantly resisting lateral forces applied to the floor panel, and
a shear load resisting coupling device connecting the floor panel to the airframe separate from the vertical load resisting coupling device, configured for resisting forces applied to the panel in a direction parallel to the top facial plane of the floor panel without significantly resisting vertical forces applied to the floor panel.

2. The floor panel connection system of claim 1, wherein the shear load resisting coupling device includes an insert positioned between the lateral edge portion of the airframe and the edge region of the floor panel.

3. The floor panel connection system of claim 2, wherein the insert has a first face and a second face, the first face having a first protruding element, the second face having a second protruding element, the first protruding element extending into an aperture in the edge region of the floor panel, and the second protruding element extending into an aperture in the lateral edge portion of the airframe.

4. The floor panel connection system of claim 3, wherein the first protruding element extends only partially through a cross-section of the floor panel.

5. The floor panel connection system of claim 3, wherein the first protruding element extends completely through a cross-section of the floor panel.

6. The floor panel connection system of claim 3, wherein the floor panel has a bottom skin and a top skin, the first protruding element extending through the bottom skin and being bonded to an inside surface of the top skin.

7. The floor panel connection system of claim 3, wherein the insert has multiple protruding elements extending into apertures in the edge region of the floor panel, and multiple protruding elements extending into apertures in the lateral edge portion of the airframe.

8. The floor panel connection system of claim 3, wherein the first and second protruding elements are aligned.

9. The floor panel connection system of claim 3, wherein the first and second protruding elements are not aligned.

10. The floor panel connection system of claim 2, wherein the insert is bonded to an underside of the edge region of the floor panel.

11. The floor panel connection system of claim 1, wherein the vertical load coupling device includes a latch member in the edge region of the floor panel, the latch member being rotatable, between an open position and a locked position, about an axis perpendicular to a top facial plane of the panel, the latch member having a flange portion that engages an underside of the lateral edge portion of the airframe when the latch is in the locked position.

12. The floor panel connection system of claim 11, wherein the latch member rotates ninety degrees between the open position and the locked position.

13. The floor panel connection system of claim 11, wherein the floor panel has an aperture, the latch member being coupled to the floor panel via an insert extending through the aperture.

14. The floor panel connection system of claim 13, wherein the insert is bonded to an underside of the floor panel.

15. The floor panel connection system of claim 13, wherein the insert and the latch member cooperatively capture the floor panel.

16. The floor panel connection system of claim 11, wherein the latch member has a rotation stop portion that contacts the airframe when the latch is in the locked position.

17. The floor panel connection system of claim 11, wherein the latch member has a protrusion that engages a detent recess in an underside of the floor panel when the latch member is in the locked position.

18. The floor panel connection system of claim 1, wherein the shear load resisting coupling device is capable of resisting a 9G shear force.

19. An apparatus, comprising:
an aircraft floor support structure having a plurality of apertures along a lateral edge portion, and
a floor panel having an edge region overlapping the lateral edge portion of the floor support structure, the floor panel including:
a vertical load resisting coupling device including a latch member in the edge region of the floor panel, the latch member being rotatable, between an open position and a locked position, about an axis perpendicular to a top facial plane of the panel, the latch member having a flange portion that engages an underside of the lateral edge portion of the floor support structure when the latch is in the locked position to connect the floor panel to the floor support structure and resist forces applied to the panel in a direction perpendicular to a top facial plane of the floor panel without significantly resisting lateral forces applied to the floor panel, and
a shear load resisting coupling device connecting the floor panel to the floor support structure separate from the vertical load resisting coupling device, configured for resisting forces applied to the panel in a direction parallel to the top facial plane of the floor panel without significantly resisting vertical forces applied to the floor panel.

20. An apparatus, comprising:
an aircraft floor support structure having a plurality of apertures along a lateral edge portion,
a floor panel having an edge region overlapping the lateral edge portion of the floor support structure,
a shear load coupling device including an insert having a first face and a second face, the first face having a first protruding element, the second face having a second protruding element, the first protruding element extending into an aperture in the edge region of the floor panel, and the second protruding element extending into an aperture in the lateral edge portion of the floor support structure to connect the floor panel to the floor support structure, the shear load coupling device being configured for resisting forces applied to the panel in a direction parallel to a top facial plane of the floor panel without significantly resisting vertical forces applied to the floor panel, and
a vertical load coupling device connecting the floor panel to the floor support structure separate from the shear load coupling device, configured for resisting forces applied to the panel in a direction perpendicular to the top facial plane of the floor panel without significantly resisting lateral forces applied to the floor panel.

21. A method of resisting shear loads on an aircraft floor panel, comprising:
positioning a shear load resisting coupling device including an insert between an airframe and a floor panel, the insert having a first face and a second face, the first face having a first protruding element, the second face having a second protruding element, the first protruding element extending into an aperture in an edge region of the floor panel, and the second protruding element extending into an aperture in a lateral edge portion of the airframe, and
positioning a vertical load resisting coupling device between the airframe and the floor panel,
wherein the shear load resisting coupling device connects the floor panel to the airframe, and the vertical load resisting coupling device connect the floor panel to the airframe separate from the shear lead resisting coupling device, and
wherein the shear load resisting coupling device is configured for resisting forces applied to the panel in a direction parallel to a top facial plane of the floor panel without significantly resisting vertical forces applied to the floor panel, and the vertical load resisting coupling device is configured for resisting forces applied to the panel in a direction perpendicular to the top facial plane of the floor panel without significantly resisting lateral forces applied to the floor panel.

22. The method of claim 21, further comprising:
inserting multiple protruding elements from the second face into apertures in the lateral edge portion of the airframe.

23. The method of claim 21, further comprising:
coupling the edge region of the floor panel to the lateral edge portion of the airframe with the vertical load resisting coupling device.

24. The method of claim 23, the coupling step comprising:
rotating a latch member on the edge region of the floor panel from an open position to a locked position, about an axis perpendicular to a top facial plane of the panel, the latch member having a flange portion engaging an underside of the lateral edge portion of the airframe when the latch is in the locked position.

* * * * *